UNITED STATES PATENT OFFICE.

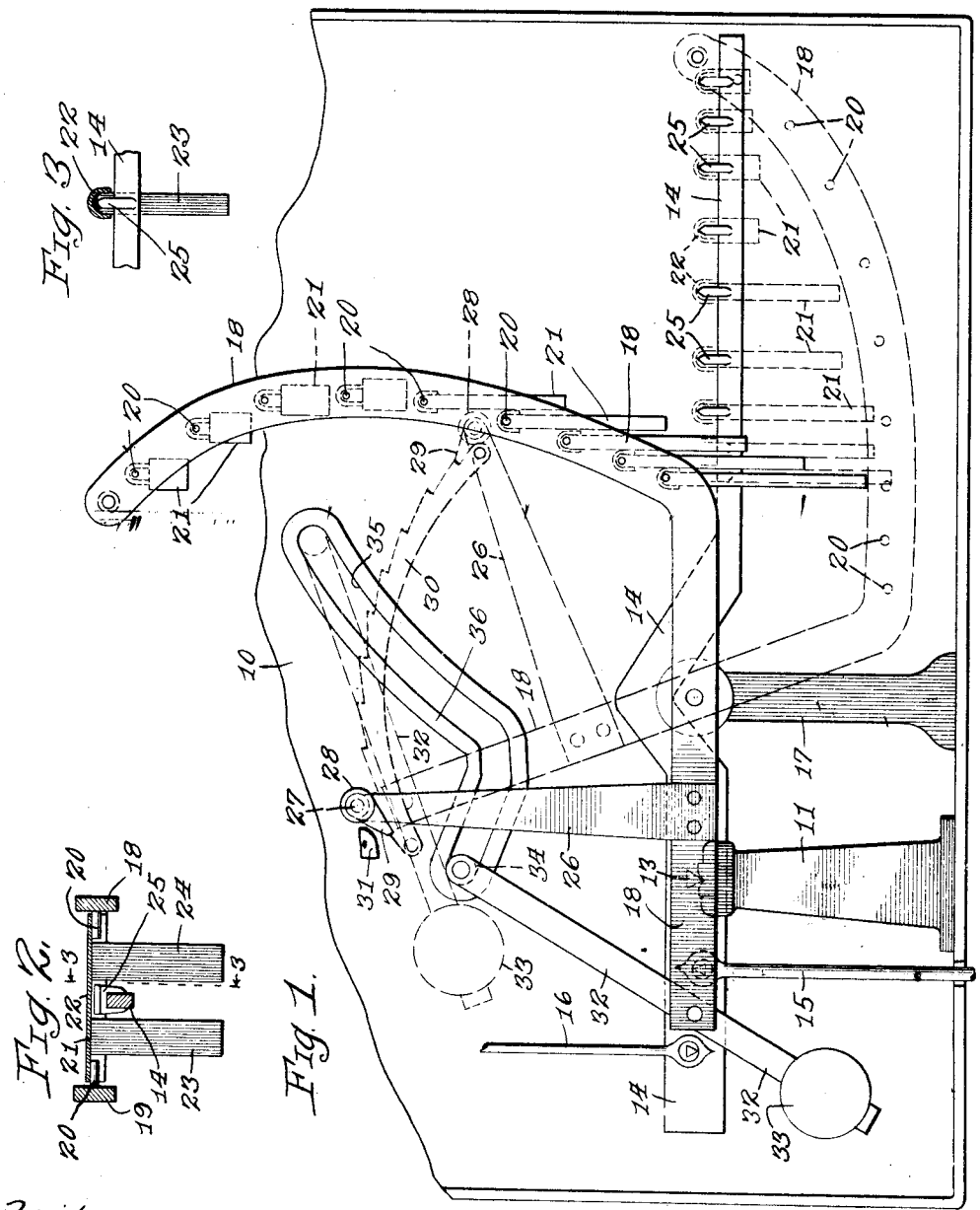

LOUIS ASHLEY OSGOOD, OF CHICAGO, ILLINOIS, ASSIGNOR, BY DIRECT AND MESNE ASSIGNMENTS, TO AMERICAN AUTOMATIC SCALE COMPANY, OF CHICAGO, ILLINOIS, A CORPORATION OF ILLINOIS.

WEIGHING APPARATUS.

1,198,651.  Specification of Letters Patent.  Patented Sept. 19, 1916.

Application filed May 2, 1914. Serial No. 835,871.

*To all whom it may concern:*

Be it known that I, LOUIS ASHLEY OSGOOD, a citizen of the United States, residing at Chicago, in the county of Cook and State of Illinois, have invented certain new and useful Improvements in Weighing Apparatus, of which the following is a specification, reference being had to the accompanying drawings.

This invention relates to improvements in weighing apparatus and particularly to the type of weighing apparatus shown in my application, Serial No. 804,800, filed December 5, 1913. In the use of the apparatus described in that application, it is necessary for the operator to move a weight-carrying lever manually to deposit upon the scale-beam one or more weights as desired. After the operation of weighing has been completed, it is necessary that the lever be returned again to normal position, withdrawing the weights from the scale-bar ready for the next succeeding operation of weighing. My application above referred to discloses the use of counterbalance weights for returning the lever to normal position or for assisting in the return of the lever to normal position. Such counterbalance weights, however, placed upon the projecting end of the lever are incapable of maintaining the lever in balance as one after another of the beam weights is deposited upon the scale-beam. As will be readily understood, if the counterbalance weights are made sufficiently heavy to counterbalance the lever in its normal position with all of the beam weights supported by the lever, the result will be that when the lever is released from its lowered position with all of the beam weights upon the beam the counterbalance weights will bring the lever back with a distinct blow threatening to disengage the beam weights from position upon the lever and tending to jar or twist the parts out of balance.

It is one of the principal objects of my invention to provide a counterbalancing mechanism which shall maintain the weight lever substantially in balance throughout its entire stroke, but such as to insure the automatic return of the lever to normal position when it is released after the completion of a weighing operation. I have accomplished this object by the use of a counterbalance weight and a differential cam as illustrated in the accompanying drawings.

That which I believe to be new is set forth in the claims.

In the drawings:—Figure 1 is a front view of a portion of a weighing apparatus of the type shown in my before-mentioned application, certain of the parts being omitted as being immaterial to the present application; Fig. 2 is an enlarged detail, partly in section, showing a perpendicular section through the weight levers with one of the weights suspended thereon; and Fig. 3 is an enlarged detail, being a section taken on line 3—3 of Fig. 2.

Referring to the several figures of the drawings in which corresponding parts are indicated by the same reference characters,—10 indicates a casing or housing of any suitable type, from the bottom of which rises a standard 11. Said standard 11 is provided at its upper end with blocks 12 between which, by means of knife-edge bearings 13, a scale-beam 14 is pivotally mounted. Pivotally connected with the scale-beam and depending therefrom is a link 15 adapted to be operatively connected in any suitable manner with a scale platform (not shown), as is well understood in the art. Pivotally connected with said beam 14 and rising therefrom is another link 16 adapted to be connected to any suitable type of balancing device to be used for weighing prior to placing upon the beam one or more of the beam weights, the link 16 corresponding to the link 57 of my application above referred to.

17 indicates a standard rising from the bottom of the casing 10 having pivotally mounted upon its upper end a weight lever comprising two bars 18—19 spaced apart as shown in Fig. 2 and secured together so as to turn in unison relative to the standard 17. The bars 18—19 are provided with pins 20 on their adjacent faces adapted to support pivotally thereon a series of weights 21. As best shown in Fig. 2, each of the weights 21 comprises a channeled bar 22 adapted to be slipped into position upon the pins 20 and two weight sections 23—24 secured in said channeled bar. The beam 14 has rising from its upper face a series of knife-edge devices 25 upon which the weights 21 are adapted to be deposited successively as the lever is turned from the position shown in solid lines in Fig. 1 to the position shown in dotted lines, in the manner described in my application before-mentioned.

26 indicates an arm secured to the bar 18 of the weight lever and extending at right angles to said bar. The arm 26 carries at its upper end a short rock-shaft 27 adapted to be turned by a button 28 which is mounted upon the shaft 27 outside of the casing 10, the front face of the casing (not shown) being provided with a suitable slot through which the shaft 27 extends and along which it can travel in the operation of the weight lever, as will be readily understood. Mounted upon the shaft 27 is a pawl 29 adapted to engage successive teeth of a rack-bar 30 which is secured in position upon the inner surface of the front face of the casing 10, such rack-bar being shown diagrammatically by dotted lines in position in Fig. 1. The shaft 27 is free to turn upon the application of a slight force thereto, but is normally held frictionally in whatever position it is placed relative to the standard 26. The casing 10 is provided with a block 31 in position to engage the pawl 29 as the weight lever is brought to the end of its stroke in counterclockwise direction in Fig. 1, serving to turn the pawl downward into engagement with the rack 30.

As will be appreciated from an inspection of Fig. 1, as the weight lever is turned upon its pivot by means of drawing the button 28 to the right in Fig. 1, the effective horizontal length of the portion of the weight lever to the left of its pivot point is gradually decreased. At the same time the effective horizontal length of the portion of the weight lever at the right of its pivot point is gradually increased, while at the same time the number of the beam weights 21 carried by the weight lever is decreased by reason of the positioning of such weights successively upon the knives 25 of the beam. In order to counterbalance the weight lever under the varying conditions as above set forth, I have provided a counterbalance weight lever 32 pivotally mounted intermediate of its ends upon the short end of the weight lever 18—19. The counterbalance weight lever 32 is provided near one end with a counterbalancing weight 33. The upper end of the lever 32 is provided with a stud or roller 34 adapted to move along a groove 35 in a cam member 36 supported in suitable position by the casing 10. The cam 36 is so shaped and so positioned that the weight lever 18—19 is maintained approximately in balance. While the effect of the differential device is to keep the weight lever substantially in balance, the effect of the counterbalancing weight 33 is to be kept great enough at all points to insure the automatic return of the weight lever to normal position upon the release of the pawl 29 from any one of the teeth of the rack-bar 30. The lever will be so nearly in balance, however, that it will not be brought back with a blow more than is necessary for forcing the pawl 29 to engaging position.

I do not desire to cover broadly by this application the use of differential means for maintaining my weight-carrying lever substantially in balance while at the same time it is adapted to turn such lever to normal condition, for the reason that such a device is shown, described and claimed in my application Serial No. 835,870, filed of even date herewith.

What I claim as my invention and desire to secure by Letters Patent, is—

1. In a scale, the combination of a beam, a device adapted to carry a plurality of weights and to deposit them successively upon said beam, a counterbalance weight movably mounted relative to said weight-carrying device, and differential means acting upon said counterbalancing weight whereby said weight-carrying device is maintained in substantially counterbalanced condition as said beam weights are deposited upon said beam or lifted therefrom.

2. In a scale, the combination of a beam, a weight-carrying device adapted to carry a plurality of weights and to deposit them successively upon said beam, a cam, and means controlled by said cam adapted to maintain said weight-carrying device in substantially counterbalanced condition as said beam weights are deposited upon said beam or lifted therefrom.

3. In a scale, the combination of a beam, a weight-carrying device adapted to carry a plurality of weights and to deposit them successively upon said beam, a cam, and means controlled by said cam adapted to move said weight-carrying device to normal position supporting all of said beam weights upon its release and adapted at the same time to maintain said weight-carrying device in substantially counterbalanced condition as said weights are deposited upon said beam or lifted therefrom.

4. In a scale, the combination of a beam, a weight-carrying device adapted to carry a plurality of weights and to deposit them successively upon said beam, a cam, and a counterbalancing weight movably mounted relative to said weight-carrying device and controlled by said cam, whereby said weight-carrying device is maintained in substantially counterbalanced condition as said beam weights are deposited upon said beam or lifted therefrom.

5. In a scale, the combination of a beam, a weight lever adapted to carry a plurality of weights and to deposit them successively upon said beam, means for turning said lever to normal position supporting all of said beam weights free of the beam, and differential means acting upon said turning means whereby said lever is maintained substantially in balance as said beam weights are deposited upon said beam or lifted therefrom.

6. In a scale, the combination of a beam, a weight lever adapted to carry a plurality of weights and to deposit them successively upon said beam, a counterbalancing weight movably mounted relative to said weight lever, and differential means acting upon said counterbalancing weight whereby said lever is maintained substantially in balance as said beam weights are deposited upon said beam or lifted therefrom.

7. In a scale, the combination of a beam, a weight lever adapted to carry a plurality of weights and to deposit them successively upon said beam, a counterbalancing weight movably mounted relative to said weight lever, and differential means acting upon said counterbalancing weight whereby said lever is automatically returned to normal position supporting all of said beam weights upon its release and whereby at the same time said lever is maintained substantially in balance as said beam weights are deposited upon said beam or lifted therefrom.

8. In a scale, the combination of a beam, a weight lever having one end turned at an angle, a plurality of weights mounted on the turned end of said lever adapted to be automatically deposited successively on said beam upon an operative stroke of said lever, means for turning said lever to normal position supporting all of said beam weights free of the beam, and differential means acting upon said turning means whereby said lever is maintained substantially in balance as said beam weights are deposited upon said beam or lifted therefrom.

9. In a scale, the combination of a beam, a weight lever adapted to carry a plurality of weights and to deposit them successively upon said beam, a second lever pivotally mounted on said first-named lever, a counterbalancing weight mounted on said second lever, and a cam acting upon said second lever as said first-named lever is given an operative stroke serving to control said counterbalancing weight whereby said weight lever is maintained substantially in balance as said beam weights are deposited upon said beam or lifted therefrom.

10. In a scale, the combination of a beam, a weight lever adapted to carry a plurality of weights and to deposit them successively upon said beam, a second lever pivotally mounted on said first-named lever, a counterbalancing weight mounted on said second lever, a stud mounted upon said second lever, and a cam member provided with a cam groove in which said stud has a working fit, said cam serving to control said counterbalancing weight as said weight lever is given an operative stroke whereby said weight lever is maintained substantially in balance as said beam weights are deposited upon said beam or lifted therefrom.

LOUIS ASHLEY OSGOOD.

Witnesses:
W. H. DE BUSK,
W. A. FURNNER.

Copies of this patent may be obtained for five cents each, by addressing the "Commissioner of Patents, Washington, D. C."